United States Patent [19]

Pacenti et al.

[11] Patent Number: 5,783,828
[45] Date of Patent: Jul. 21, 1998

[54] APPARATUS AND METHOD FOR TRITIUM MEASUREMENT BY GAS SCINTILLATION

[75] Inventors: Paolo Pacenti; Fabrizio Campi; Cristina Mascherpa; Claudia Sterlini, all of Milan, Italy

[73] Assignee: European Atomic Energy Community (EURATOM), Plateau de Kirchberg, Luxembourg

[21] Appl. No.: 716,316

[22] PCT Filed: Jan. 26, 1996

[86] PCT No.: PCT/EP96/00394

§ 371 Date: Dec. 2, 1996

§ 102(e) Date: Dec. 2, 1996

[87] PCT Pub. No.: WO96/24072

PCT Pub. Date: Aug. 8, 1996

[30] Foreign Application Priority Data

Feb. 2, 1995 [GB] United Kingdom ............... 9502050

[51] Int. Cl.⁶ ..................................... G01T 1/205
[52] U.S. Cl. ................. 250/364; 250/361 R; 250/362
[58] Field of Search ........................ 250/361 R, 362, 250/364, 432 R, 435, 393

[56] References Cited

U.S. PATENT DOCUMENTS

| | | |
|---|---|---|
| 2,759,107 | 8/1956 | Armistead et al. |
| 3,647,387 | 3/1972 | Benson et al. |
| 4,092,539 | 5/1978 | Pao et al. ............ 250/364 X |
| 4,975,575 | 12/1990 | Perlman ............... 250/255 |

FOREIGN PATENT DOCUMENTS

| | | | |
|---|---|---|---|
| A2 0 276 858 | 8/1988 | European Pat. Off. | |
| 257373 | 6/1988 | Germany | 250/380 |
| 1-287493 | 11/1989 | Japan | 250/364 |
| 1144506 | 8/1985 | Switzerland | |
| 1718165 | 3/1992 | U.S.S.R. | 250/364 |
| 1 540 431 | 2/1979 | United Kingdom | |
| WO 94/20835 | 9/1994 | WIPO | |

OTHER PUBLICATIONS

Chiles, "Evaluation of a Thin $CaF_2(Eu)$ Scintillator for Detecting Tritium" IEEE Trans. on Nuclear Science, vol. ns-34, No. 1, Feb. 1987, ISA, pp. 386-388.

Baron, et al., "A Gas Scintillation Detector for Soft X Radiation", Instruments and Experimental Techniques, vol. 17, No. 3i, May 1994, New York, USA, pp. 693-695.

*Primary Examiner*—Edward J. Glick
*Attorney, Agent, or Firm*—Bacon & Thomas

[57] ABSTRACT

The present invention relates to an apparatus and a method for measuring tritium specific activity by gas scintillation. The specific activity is measured when the tritium is mixed in carrier streams of certain gases which serve as scintillation detection media. The apparatus comprises a detection chamber with connections for gaseous inlet and outlet, the detection chamber being optically connectable to at least one UV photomultiplier tube, which tube is connectable to means for measuring photon emittance.

5 Claims, 2 Drawing Sheets

APPARATUS AND METHOD FOR TRITIUM MEASUREMENT BY GAS SCINTILLATION

This invention relates to an apparatus and a method for measuring tritium specific activity in gaseous form when it is mixed in carrier streams of certain gases which serve as scintillation detection media.

Photons emitted in the interaction of tritium beta particles with the scintillating gas are detected by photomultiplier tubes or photodiodes and are converted to charge pulses.

Tritium is found in various chemical and physical forms in tritium extraction plants, experimental fusion centers and other nuclear facilities. An important aspect in fusion technology development is the assessment of new real time detection and accountancy methodology of tritium in gaseous forms.

Liquid and solid phase scintillation detectors are widely used as tritium detectors. Experience has been gained for the scintillation properties of some noble gases such as xenon, argon, and helium. Gas scintillator detectors have been used in the past for alfa particles, fission fragments and heavy ions spectroscopy. Another application of this technique is thermalized and fast neutrons detection by means of (n,α) e (n,p) nuclear reactions. At the present, proportional scintillation counters are used to measure low energy cosmic X rays, as well as γ and beta radiations.

The mechanism giving rise to the scintillation photons is as follows: the incident radiation or charged particle produces a population of excited gas molecules as it passes through the scintillator. As these excited molecules return to their ground state, through a variety of different mechanisms, photons are emitted during the transition from the two lowest molecular excited states to the ground state and much of the emission lies in the ultraviolet and a part in the visible region of the spectrum. Scintillations can be detected directly by means of photomultiplier tubes or photodiodes that are sensitive in the near ultraviolet region.

The overall scintillation efficiency of gases is characteristically quite low, due to a number of parallel modes of de-excitation, such as intermolecular collisions or internal interference processes normally referred to as a quenching effect. The major disadvantage of gas scintillators is their low light yield, which is at best an order of magnitude below that of NaI(Tl) for equivalent particle energy loss. On the other hand gas scintillators have some advantages compared with other detectors as they have a fast response time and high flexibility, variable shape and sensitive volume. A considerable amount of experimental data is available in the spectrometry of alfa radiations introduced inside the detector as solid sources or to detect external sources of low energy X and γ rays.

According to the invention, the gas scintillation detection method is applied to the measurement of tritium in carrier gases. The measurement of tritium specific activity in inert carrier gases, under either static or dynamic conditions, is suitable for several subsystem configurations of tritium fuel cycle facilities, such as storage of tritium to be purified, tritium distribution system and gaseous detritiation system.

An example of application of this detection method is the on-line real time tritium measurement in the inert atmosphere purification system of a glove box for argon environments. Glove boxes atmospheres, for tritium handling purposes, are normally dry argon, nitrogen or helium as inert gases.

According to the invention, there is provided a method for measuring the specific activity of a tritiated gaseous stream using the scintillation property of some carrier gases which carry tritium in the gas phase.

The method apparatus and object of the invention described above, present some advantages in comparison with other well established flow-through tritium process monitors, in particular applications, as follows:

no active part of the instrument is present in the sensitive volume of the detector, and in particular in the tritiated carrier flow, and no feed throughs are necessary so that tritium compatible materials, as reflective as possible for UV photons, can be used as internal detector walls to minimize tritium ad/absorption on surfaces and therefore minimize the memory effect, a fairly large range of temperatures are possible, both for the gas flow and for the detection chamber, taking care to keep the PMTs cooled in order to minimize the inherent background electrical noise. The temperature range for the invention is from that of liquid nitrogen to any temperature within the functioning temperature of the PMT (with cooling), the range of measurement of tritium in a carrier gas in larger than that of an ionization chamber with similar working parameters, it has an instantaneous response time, it allows high flexibility in detector shape and sensitive volume; the choice of a particular geometry is the result of the compromise between the best geometric efficiency and the limit of detection required, the monitor sensitivity is linearly dependent on gas total pressure until the range in air of tritium betas becomes larger than the dimensions of the chamber, for relatively small sensitive volumes (1–2 liters) and for gas pressures equal and lower than 1 bar, the monitor sensitivity is comparable or better than that of a flux ionization chamber of the same sensitive volume, the detector response can be calibrated for any gas mixture, of a particular carrier gas and of gas impurities at various concentrations the apparatus, completed with the acquisition system, has a relatively low cost compared with that of ionization chamber of similar performances.

Several possible construction solutions can be adopted to assess a detector apparatus which applies the gas scintillation detection method; the particular application of said method will determine the suitability of various materials for construction: common features of the detector apparatus will now be described with reference to the drawings of which:

Figure 1:
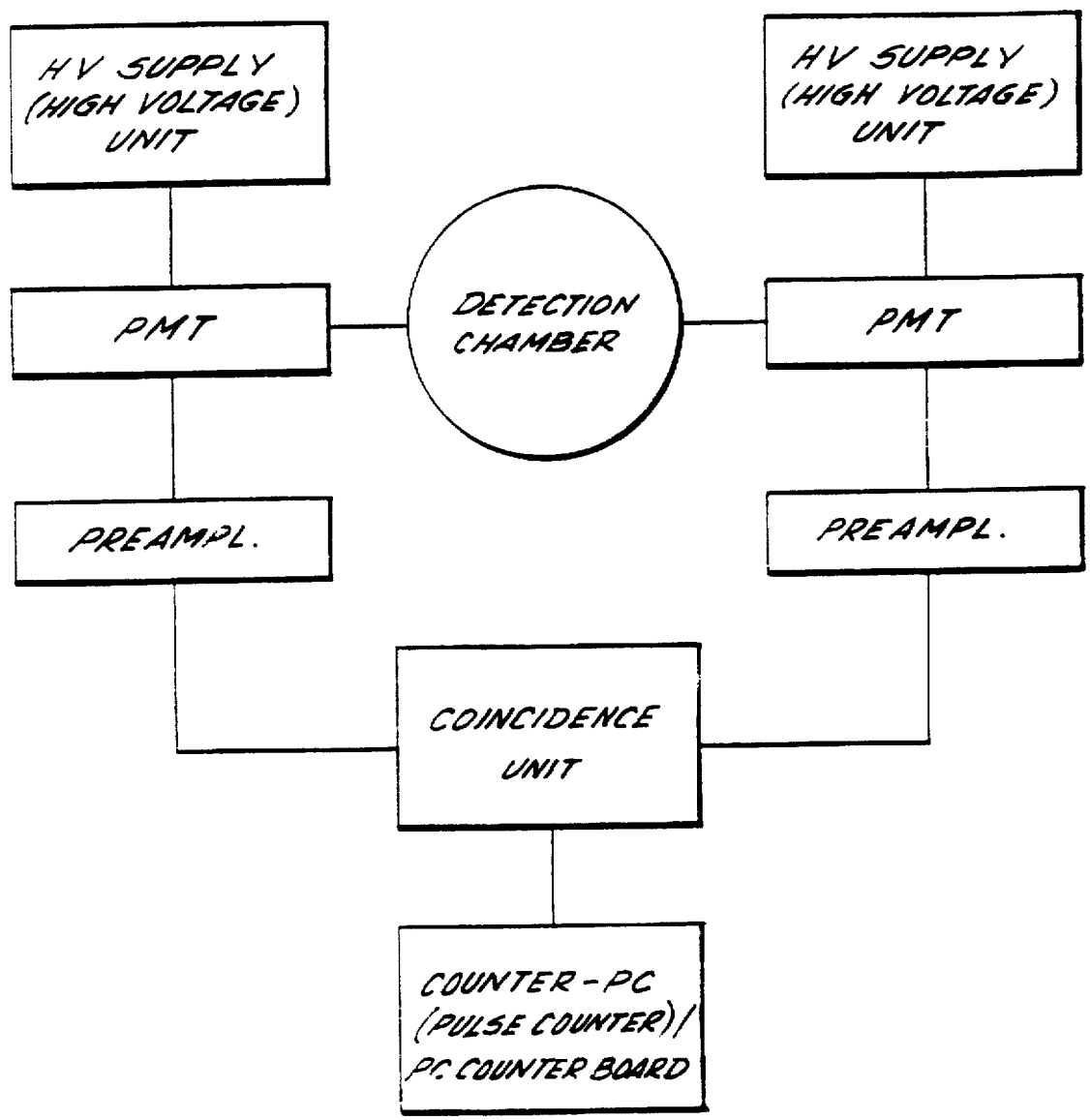
FIG. 1 is a block diagram of the detector apparatus.
Figure 2:
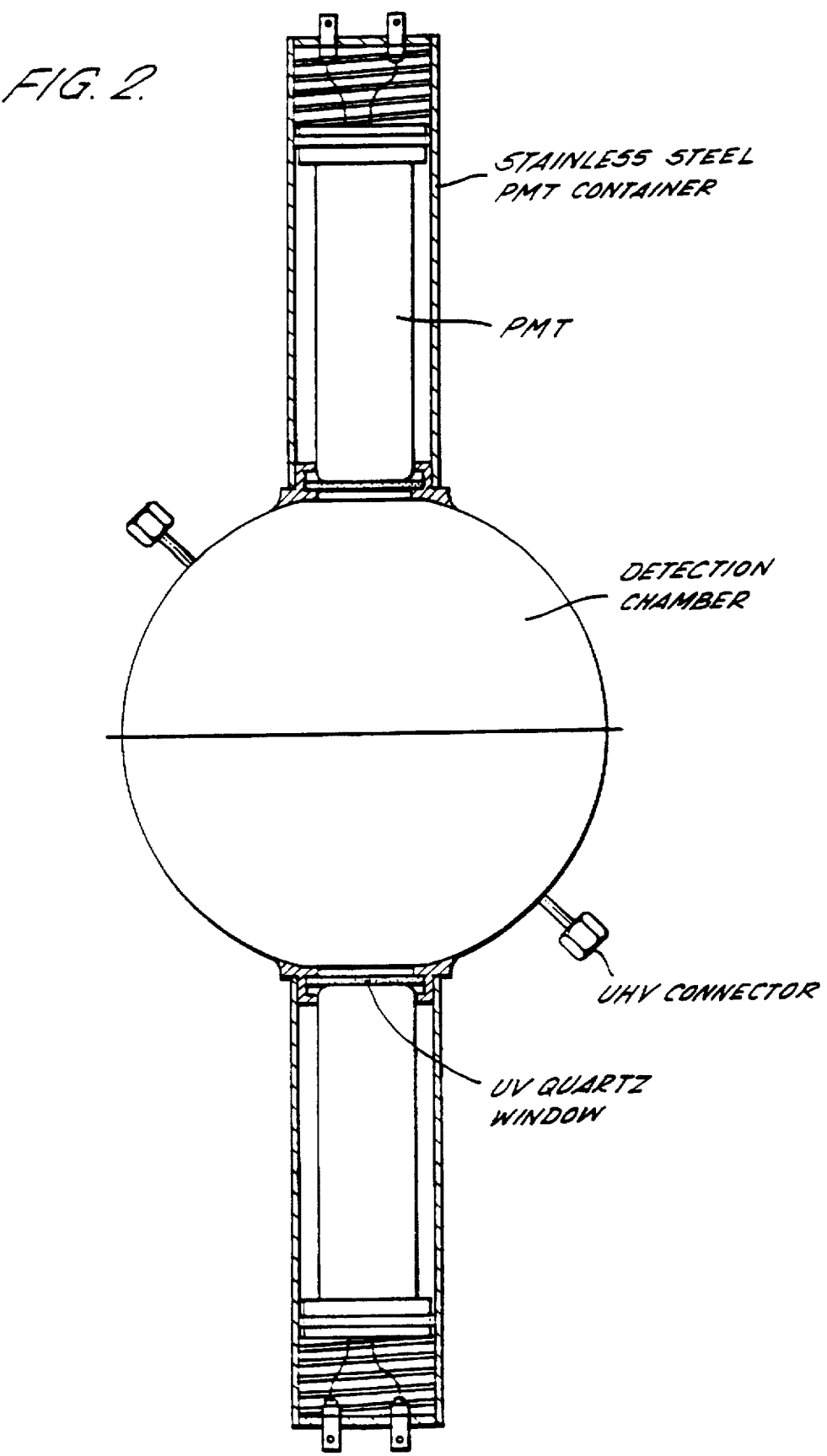
FIG. 2 is a diagrammatic section of a prototype gas scintillation tritium detector.

The detection apparatus, as shown in FIG. 1 and FIG. 2 consists of a closed, darkened chamber, with a view port to house a PhotoMultiplier Tube (PMT), and two connectors for gas inlet and outlet.

When the chamber shape is not already determined by the specific tritium compatible system, which house the detector, the best detector geometric efficiency should be taken into account.

The detector internal surfaces are as reflective as possible for ultraviolet photons in order to maximize photon collection efficiency on the PMT photocathode. The view port is as much transparent as possible for ultraviolet emission. All internal detector surfaces are treated to minimize tritium adsorbtion and absorbtion in order to reduce the tritium "memory" effect.

The measuring volume can be positioned between the photocathodes of two photomultipliers facing each other to obtain maximum light yield (FIG. 1). In this case the PMT signals are sent to a coincidence unit, to reduce the interference caused by external source pulses and to minimize the inherent background electrical noise. Signals are analyzed and recorded by a conventional data acquisition system.

The PMTs high voltage configuration is such that their outputs can be acquired both in pulse mode and in current mode. The high voltage and the gain can be varied in order to optimize the signal to noise ratio. Refrigeration of the PMTs and adoption of electronic bands, in order to select only the pulse heights corresponding to tritium, improve the detection efficiency and the lower detection limit. The electronic amplifying system has a rise time in the order of magnitude of nanoseconds.

The carrier gas can be nitrogen or a noble gas, or a mixture of two or more thereof. Xenon and argon have the best light yield. The light yield of the gas scintillator depends on gas pressure and on the concentration of gas impurities. Impurities are responsible for interference in the gas scintillation process and cause a quenching effect on counting efficiency.

The effect of impurities at the present is not completely understood. It is well known that small quantities of nitrogen in the scintillating gas act as a wave length shifter and usually small concentrations of gases which are not related with the scintillation process (e.g. less than 1% of oxygen in argon) cause a quenching effect of the light output and therefore a reduction in the detection efficiency.

The quenching effect of a relatively high percentage of hydrogen isotopes in the scintillation carrier gas is not yet known. A partial pressure of pure tritium ($T_2$, HT) in the carrier gas, corresponding to extremely high specific activity, can cause a quenching effect and the non-linearity of the response curve of light output intensity versus tritium concentration.

Experimental data demonstrates that light emission from a scintillating gas exposed to γ radiations of external sources is about constant in the range 100–800 mmHg absolute pressure. Nevertheless, given the low photon production caused by tritium beta decadiments in the gas, the effect of the self-adsorbment by the scintillating gas itself influences the light emission. Therefore the best detector geometric dimensions are a function of the operating pressure and they must be experimentally determined for any different prototype to be realized.

The overall detection efficiency is a function of two main opposite phenomena: total gas pressure increase leads to an increase of scintillating particles in favour of light emission, but at the same time it leads to an increase of self-adsorbment of the emitted photons by particles themself.

Therefore the choice of one or two PMTs working in coincidence depends on the particular application and it is the result of a compromise between the maximum light collection efficiency and the minimum background count rate, in order to obtain the lowest limit of detection of tritium in the gas.

Measurements over a large range up to 12 scales are virtually possible using a dedicated electronic acquisition system even if the detector gives its best performances as a process monitor for low tritium specific activity.

A prototype gas scintillation detector has been developed (FIG. 1). Preliminary results have been obtained and are described as follows; the apparatus consists of a spherical, stainless steel detection chamber of about 8000 cm$^3$ volume, with two UV grade quartz view ports optically coupled to 2" diameter UV PMTS, and two connectors for gas inlet and outlet (FIG. 1). The UV PMTs are situated within a stainless steel PMT container. Argon gas was used as the scintillation medium. Internal metal surfaces were electropolished and specular, to increase the reflection of the particular wave length and to provide the best detector for geometric efficiency. Small quantities of triatiated gas, precisely measured were introduced in the monitoring system.

EXAMPLE

Several tests were carried out in order to establish the detector response and reproducibility at varied tritium specific activity, gas total pressures and gas impurities at different concentration, both in static and dynamic conditions. The lower limit of detection of tritium in the high purity Argon carrier gas, based on the 30 value confidence level of the background count rate and on 10 seconds counting time, was 0.5 µCi/m$^3$ (2*10$^4$ Bq/m$^3$) which is 40 times below the DAC (derived air concentration) in air for HTO (tritiated water) form.

The response versus total pressure curve, obtained with this prototype, at a fixed tritium activity, presented a maximum in correspondence of 100 Torr and a signal of about 10% less at atmospheric pressure. This is the result of the two competitive phenomena of light emission increase and increase of photon self-adsorbtion by the scintillating gas itself. The response curve versus tritium specific activity was linear within the range of values tested during the experiment.

According to the given detector configuration, similar curves were obtained from the two single PMTs and from the coincidence unit but the lower limit of detection was achieved integrating output signals obtained at the coincidence unit over a few seconds counting time.

The effect of oxygen present as impurity in the scintillating gas was investigated: 0.4% in volume of $O_2$ in Argon causes quenching of the light output and therefore a 40% reduction in the detection efficiency. The effect of $O_2$, so as that of air and hydrogen, was not statistically relevant at concentrations below 1000 ppm.

No tritium memory effects were noted after several tests, with the tritium specific activities involved during the experiment.

Better performances were obtained by improving the signal to noise ratio, the detector overall counting efficiency and screening the apparatus by external source pulses so that a low limit of detection low than 0.1 µCi/m$^3$ (5*10$^3$ Bq/m$^3$) was achieved.

We claim:

1. A method for measuring the specific activity of gaseous tritium, said method comprising: mixing a carrier gas scintillator with gaseous tritium, detecting photons emitted from the carrier gas scintillator mixed with the gaseous tritium, and measuring said specific activity from the detected photons.

2. A method as claimed in claim 1 wherein the carrier gas is nitrogen, a noble gas or a mixture of two or more thereof.

3. A method as claimed in claim 2 wherein the photons are converted to charge pulses and measured by photomultiplier tubes or photodiodes.

4. A method as claimed in claim 1 wherein the photons are converted to charge pulses and measured by photomultiplier tubes or photodiodes.

5. Apparatus for measuring the specific activity of gaseous tritium mixed with a carrier gas scintillator, said apparatus comprising: a detection chamber with connection for inlet and outlet of a mixture of the carrier gas scintillator and the gaseous tritium, the detection chamber being optically connected to at least one UV photomultiplier tube for measuring photon emittance from said mixture, and said tube being connected to means for measuring said specific activity from the measured photon emittance.

* * * * *